Nov. 27, 1956 R. L. KEETON ET AL 2,772,066
PILOT CONTROLLED DIAPHRAGM VALVE
Filed Dec. 22, 1952
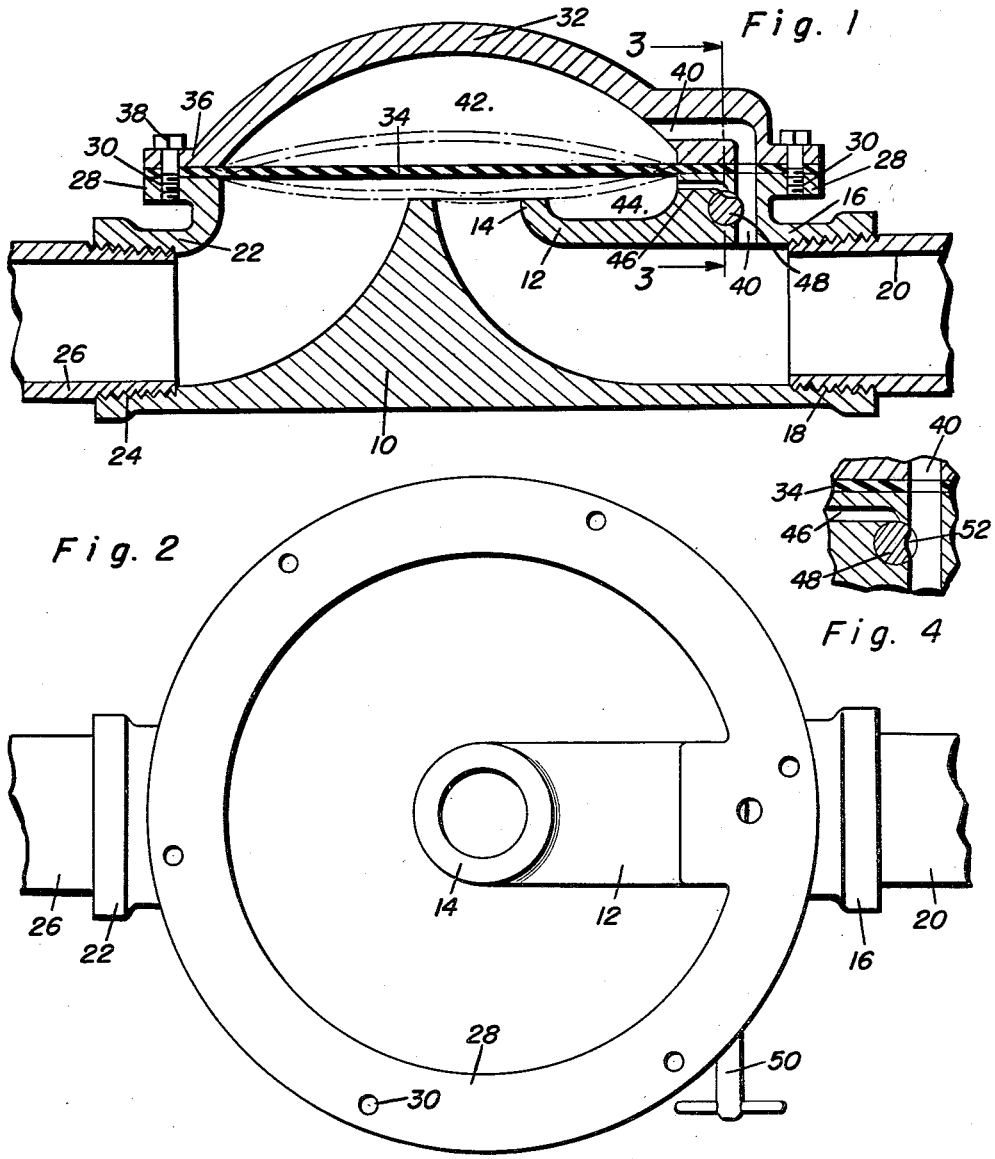
Ralph L. Keeton
Fields E. Kesler
INVENTORS
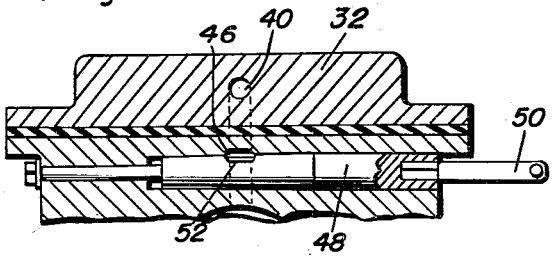

United States Patent Office 2,772,066
Patented Nov. 27, 1956

2,772,066

PILOT CONTROLLED DIAPHRAGM VALVE

Ralph L. Keeton and Fields E. Kesler, Lubbock, Tex.

Application December 22, 1952, Serial No. 327,302

1 Claim. (Cl. 251—46)

This invention relates to fluid control apparatus and more particularly to a form of pressure actuated valve.

The primary object of this invention resides in the provision of valve in which a relatively small valve control member is adapted to control the fluid flow through the entire valve by permitting passage of a fluid through a small relief conduit to compensate for pressure otherwise closing a diaphragm in the valve thus opening the diaphragm so as to permit the passage of fluid.

The construction of this invention features the use of a diaphragm secured between a valve casing and a valve cover. Extending through the valve casing and the cover is a pressure regulating passageway. A relief conduit is provided and opens into the relief passageway and the casing below the diaphragm. A valve member is provided for controlling fluid flowing through the relief conduit.

Still further objects of the invention reside in the provision of a valve that is strong, durable, highly efficient in operation, simple in construction and manufacture, capable of being installed for various purposes in controlling the flow of fluids, and which is relatively inexpensive to produce.

These, together with the various ancillary objects of the invention which will become apparent as the following description proceeds, are attained by this valve, a preferred embodiment of which has been illustrated in the accompanying drawing, in order to illustrate a form of the invention, by way of example only, wherein:

Figure 1 is a vertical sectional view of a basic and preferred form of the invention;

Figure 2 is a top plan view showing the construction of the casing with the cover removed therefrom;

Figure 3 is a vertical sectional detail as taken along the plane of line 3—3 in Figure 1; and, Figure 4 is a sectional detail view showing the position of the valve member when closing the conduit.

With continuing reference to the accompanying drawings wherein like reference numerals designate similar parts throughout the various views, reference numeral 10 generally designates a casing which has integrally cast therewith a delivery conduit 12, which conduit terminates in a delivery opening 14 concentric with the cylindrical casing 10. The casing 10 has integrally molded therewith a cylindrical extension 16 forming an intake port which is internally threaded as at 18 for reception of an externally threaded section of a delivery pipe. A further cylindrical extension 22 which is internally threaded as at 24 is provided and acts as an exhaust port and is threadedly connected to an exhaust pipe 26. The casing is provided with an upper annular flange 28 which has spaced threaded apertures 30 therethrough.

A cover member which is dome shaped is provided as at 32 and a diaphragm 34 positioned between the cover 32 and the casing 10 rests on the flange 28. The diaphragm 34 may be formed of any suitable resilient material as is conventionally used in diaphragms. The cover 32 is provided with an annular flange 36 which corresponds to the flange 28 and bolts 38 are threadedly engaged in the apertures 30 and hold the cover 32 and the diaphragm 34 to the casing 10. Extending upwardly through the delivery conduit 12 is a passageway 40 which extends through the diaphragm 34 and then bends normal to the other portions so as to open into the pressure chamber 42 formed by the cover 32 and the diaphragm 34. Opening into the conduit 40 and into the space 44 between the diaphragm 34 and the upper wall of the conduit 12 is a relief passageway 46. A valve member 48 is rotatably secured in the casing 10 for selectively closing the relief conduit 46. The valve member 48 is in the shape of an elongated truncated cone and is provided with an actuation handle portion 50 for rotating such. There is further provided an eccentric surface 52 in the portion of the valve member 48 adjacent the opening 46. This eccentric surface provides the means for closing the relief conduit 46.

The fluid upon entrance into the intake port 16 is directed through the pressure regulating passageway 40 and builds up pressure in the pressure chamber 42. Since this pressure is equal to the pressure applied on the opposite side of the diaphragm and is applied over a larger area, the force applied for closing the delivery opening is greater than the force applied oppositely. This causes the diaphragm 34 to close the delivery opening 14 as is shown in the dotted lines in Figure 1. When it is desired to permit flow of fluid through the delivery opening 14 and out of the exhaust port 22 it is merely necessary to rotate the operating handle 50 so as to rotate the valve member 48. This permits flow of fluid through the relief conduit 46 thus compensating for the pressure built up in the pressure chamber 42 by increasing the area on which pressure opposing closing action is directed. Obviously, before actuation of the valve member 48, since there was no pressure at the discharge end of the conduit the pressure of the water entering through the discharge opening was not sufficient to overcome the pressure in the pressure chamber 42. However, as soon as the valve member 48 has been actuated to permit fluid flow through the relief conduit 46, fluid will pass into the space as at 44. This fluid, since it has no head to drive it will stand below the diaphragm until the casing 10 and the exhaust pipe 26 is filled and the pressure in the chamber 42 is compensated. Further, it is to be recognized that the diaphragm 34 is of resilient material and will tend to return to an initial position. At that time fluid will flow through the delivery opening 14. Additionally pressure from chamber 42 will exhaust into the discharge end of the valve through conduit 46.

Since from the foregoing the construction and advantages of this valve is readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to that fall within the scope of the appended claim.

What is claimed as new is as follows:

A pressure actuated valve comprising an open sided cylindrical valve casing and having an intake port and an exhaust port, a delivery conduit integrally formed with said casing, said conduit terminating in a delivery opening coaxial with said casing, a cover secured to the open side of said casing, a resilient diaphragm secured over said open side and said delivery opening between said casing and said cover forming a pressure chamber between said diaphragm and said cover, a passageway extending from said intake port through said delivery conduit, said diaphragm and said cover and opening into said pressure chamber, and pressure compensating means for selectively opposing the pressure in said pressure chamber, said pressure compensating means comprising an opening in said casing communicating with said passageway and said open side of the casing, said opening being positioned below said diaphragm, a rotary valve member having an eccentric surface for selectively closing said opening, said valve member being rotatably mounted in said casing.

References Cited in the file of this patent

UNITED STATES PATENTS

| | | |
|---|---|---|
| 151,969 | Gurney | June 16, 1874 |
| 595,061 | Gulland | Dec. 7, 1897 |
| 925,538 | Weaver | June 22, 1909 |
| 1,621,910 | Thomson | Mar. 22, 1927 |
| 2,328,323 | Bowers | Aug. 31, 1943 |
| 2,335,729 | Bjergel | Nov. 30, 1943 |